United States Patent [19]

Kubach

[11] Patent Number: 4,664,355

[45] Date of Patent: May 12, 1987

[54] DOUBLE-ACTING MAGNETIC VALVE

[75] Inventor: Hans Kubach, Korntal-Munchingen, Fed. Rep. of Germany

[73] Assignee: Robert Bosch GmbH, Stuttgart, Fed. Rep. of Germany

[21] Appl. No.: 870,463

[22] Filed: Jun. 4, 1986

[30] Foreign Application Priority Data

Jul. 30, 1985 [DE] Fed. Rep. of Germany ....... 3527174

[51] Int. Cl.$^4$ ......................... F16K 31/08; H01F 7/08

[52] U.S. Cl. ................................ 251/65; 251/129.09; 335/230; 335/234

[58] Field of Search ................ 251/65, 129.16, 129.09; 335/229, 230, 234

[56] References Cited

U.S. PATENT DOCUMENTS 3,977,436 8/1976 Larner ............................. 251/65 X 4,442,418 4/1984 Myers ................................ 335/230

4,512,549 4/1985 Gast et al. ......................... 251/65 X

*Primary Examiner*—Arnold Rosenthal

*Attorney, Agent, or Firm*—Edwin E. Greigg

[57] ABSTRACT

A magnetic valve that is switchable in two directions is proposed. The valve comprises an armature, which is firmly joined to a valve body; at least two magnetic coils disposed in one plane and having ferromagnetic cores inserted in them; and two pole bodies, which are joined to the cores and with them belong to the electromagnetic circuit, and acts on the oppositely located flat sides of the armature. Permanent magnets are inserted into the pole bodies in such a way that the operative surface area of the pole bodies is divided into a number of zones, each having a homogeneous magnetic orientation in which the number of zones is equal to the number of magnetic coils.

4 Claims, 3 Drawing Figures

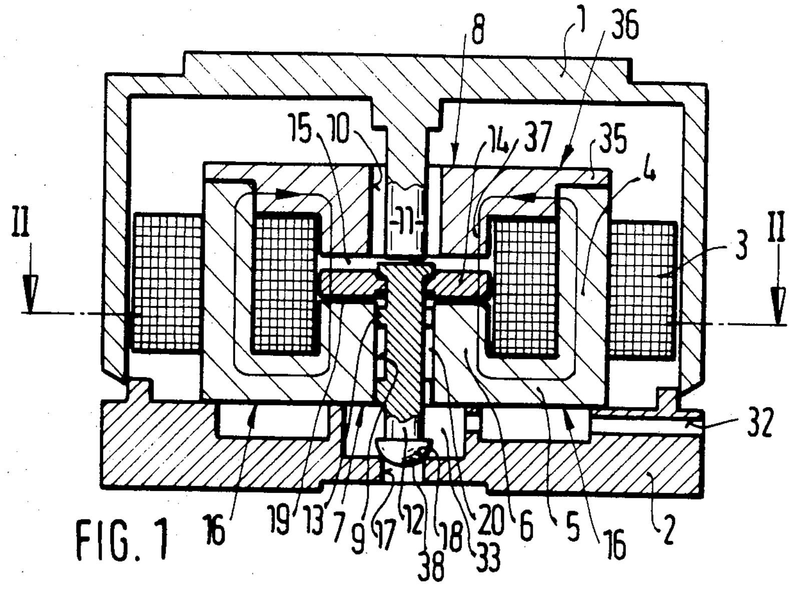
FIG. 1
FIG. 2
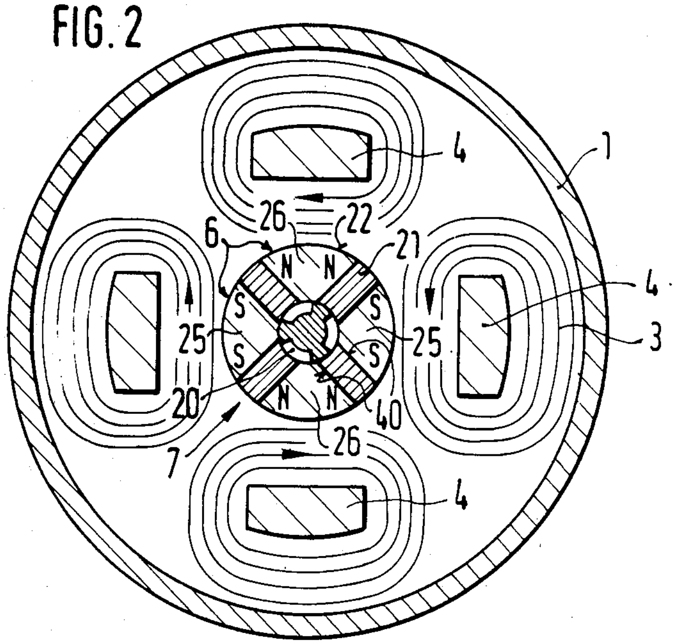

DOUBLE-ACTING MAGNETIC VALVE

BACKGROUND OF THE INVENTION

The invention is based on a double-acting magnetic valve as generally defined hereinafter. A magnetic valve has already been described which operates by superimposing the fields of one permanent magnet and two electromagnets. In this magnetic valve, to effect the opening and closing movements, respectively, one or the other of the magnetic coils at a time is supplied with current. The structural size means that the magnetic force is small.

OBJECT AND SUMMARY OF THE INVENTION

The magnetic valve according to the invention has the advantage over the prior art that the structural size is diminished, or in other words the specific magnetic force is increased. Because permanent magnets are introduced between the poles of the electromagnetic circuits, the full magnetic flux density is attained despite the dispersion of the magnetic flux in the gap between the armature and the poles. The number of poles can therefore be increased, as compared with known embodiments. As a result, it is possible to reduce the mass of the armature and the self-resonance of the switch system is increased, so that the movement energy of the armature is dissipated within a brief time, and vibration and recoiling of the armature in the time prior to the next switching event are precluded. Since there are no radial magnet gaps, the forces in the radial direction in the magnetic valve according to the invention are also diminished, while friction losses are simultaneously lessened as well.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows in cross section a first exemplary embodiment of a magnetic valve according to the invention;

FIG. 2 is a section taken along the line II—II in FIG. 1; and

DESCRIPTION OF THE PREFERRED EMBODIMENTS

Figure 3:
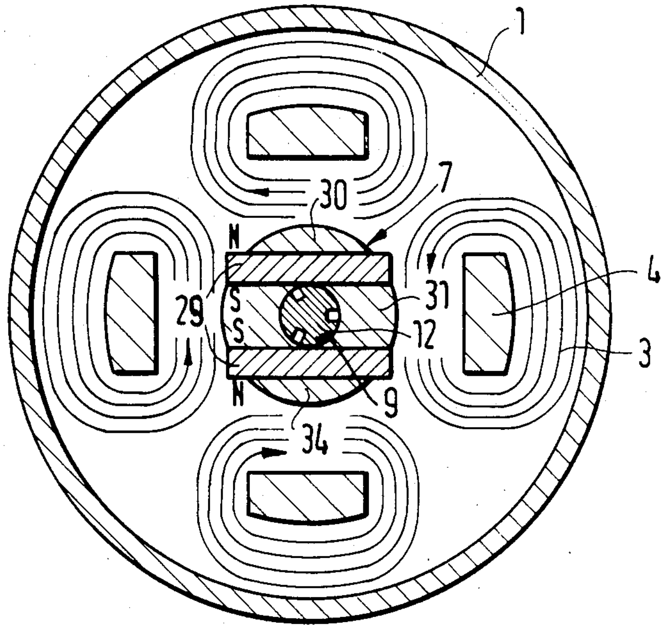
FIG. 3 shows a second exemplary embodiment of a magnetic valve according to the invention.

The magnetic valve shown in the drawing is located in a housing embodied in two parts, a cup-shaped valve housing 1 and a flat housing bottom 2. At least two magnetic coils 3 are located in the housing, disposed symmetrically with the center axis of the magnetic valve. Alternatively, any other even number of magnetic coils 3 is possible. FIGS. 1 and 2 show an embodiment having four magnetic coils 3, spaced apart from one another by approximately the same distance. Each magnetic coil 3 includes a core 4 of soft-magnetic material that extends parallel to the center axis of the magnetic valve, and each core 4 is joined via a radially extending crossbar 5 to a first pole piece 6 that also extends parallel to the center axis. The core 4, crossbar 5 and first pole piece 6 form a soft-magnetic first conductor body 16, which is U-shaped and, with the first pole piece 6, each first conductor body 16 at least partly surrounds a respective magnetic coil 3 on its side toward the center axis of the magnetic valve. The first pole pieces 6 grouped about the center axis of the magnetic valve together form a first pole body 7, which has a preferably cylindrical jacket. A second conductor body 36 rests, with a contact step 35, on the side of each core 4 remote from the crossbar 5, and with a second pole piece 37 partly surrounds each associated magnetic coil 3 on its side toward the center axis of the magnetic valve. The second pole pieces 37 are oriented toward and spaced axially apart from the first pole pieces 6 and together form a second pole body 8 having a preferably cylindrical jacket. The first pole body 7 and second pole body 8 each have a continuous coaxial bore 9 and 10, respectively. The bore 10 in the second pole body 8 is adapted to receive a projection 11, that is provided on the valve housing 1 and which is arranged to protrude into the interior thereof. A cylindrical valve body 12 is guided, for instance by means of protrusions 13 secured to the circumference of the valve body 12, in the bores 9 of the first pole body 7 comprising the pole pieces 6. The annular gap 20 formed between the bore 9 of the first pole body 7 and the valve body 12 serves to enable the inflow and outflow of fluid on the occasion of positive displacement by a magnet armature 14, for instance when the magnetic valve is used in the control of fuel supply to an internal combustion engine. This magnet armature 14 is in the form of a disk, the circular end faces of which are approximately the same size as the end faces oriented toward them of the pole bodies 7 and 8. The thickness of the magnet armature 14 is less than the axial spacing between the pole bodies 7 and 8; as a result, one air gap forms between the magnet armature 14 and the first pole body 7, and another forms the magnet armature 14 and the second pole body 8. The valve body 12 and the magnet armature 14 are joined together in such a way that when the valve body 12 is in contact with the projection 11, a gap 15 remains between the second pole body 8 and the magnet armature 14. Upon a movement of the magnet armature 14 in the opposite direction, toward the first pole body 7, the valve body 12 rests with a closing head 38 on a valve seat 18 that cooperates with the closing head 38 and is embodied by the opening of a coaxial bore 17 in the housing bottom 2. In this case, a gap 19 remains between the magnet armature 14 and the first pole body 7.

FIG. 2 shows the structure of the first pole body 7 (because of symmetry, this is applicable to the pole body 8 as well). In the exemplary embodiment shown, having four magnetic coils 3, the cylindrical first pole body 7 is divided into four first pole pieces 6 and four permanent magnets 21.

The cross-sectional shape of first pole pieces 6 is approximately that of a sector of a solid cylinder, each being approximately one-fourth of a circle segment having flat sides 40. The associated flat sides 40 of two adjacent first pole pieces 6 extend spaced apart from one another, and one of the flat permanent magnets 21 is inserted in between each two facing flat sides 40 in such a way that the four first pole pieces 6 in the form of quarter solid cylinders and the four permanent magnets 21 together form a closed circular cross section. The arrangement of the first pole piece 6 and the permanent magnets 21 is such that the face 22 of each first pole piece 6, which simultaneously forms the circular circumference of the first pole piece and is also part of the outer jacket of the cylindrical first pole body 7, is oriented toward the core 4 that cooperates with that particular first pole piece 6.

As already indicated, the above description relates to a magnetic valve having four magnetic coils 3. If some other whole number of magnet coils is used, then the number of cores 4, first pole pieces 6, permanent magnets 21 and crossbars 5 varies in the same way. The approximately quarter-circular shape of the first pole pieces 6 shown here then varies as well, to become approximately one-half, one-sixth, or some other fraction of a circle.

The permanent magnets 21 are poled such that the north and south poles of a permanent magnet 21 are oriented each toward a respective face 40 of adjacent first pole pieces 6, which extend along and in contact with this face 40. Like magnetic poles of adjacent permanent magnets are in contact with the faces 40 of a given pole piece 6. Each pole piece 6 is bordered on its sides by two permanent magnets 21, and its faces 40 are contacted by like poles of each two magnets 21: N-N for the first pole piece, S-S for the next, N-N for the third, and so on around the circle. Each first pole piece 6 located between each two adjacent permanent magnets 21 is thus subjected to a permanent homogeneous magnetization, which corresponds to the magnetization of the faces of the permanent magnets 21 resting laterally against it. The number of first pole pieces 6 magnetized as south poles is equal to the number of first pole pieces 6 magnetized as north poles.

The second pole body 8 is structurally like the first pole body 7 and is located mirror-symmectrically opposite it, so that permanent magnets 21 located opposite one another have like pole arrangements.

A fluid flow conduit 32 is formed in the housing bottom 2, discharging into a chamber 33 that surrounds the valve body 12 in the vicinity of the closing head 38. At the valve seat 18, the chamber 33 merges with the bore 17.

The electric triggering of the magnetic coils 3 is done such that each two opposite cores 4 have the same direction of the induced magnetic flux, and each two adjacent cores 4 have the opposite direction of the induced magnetic flux. Together with the magnetic fields generated in the first and second pole bodies 7 and 8 by the permanent magnets 21, triggering the magnetic coils 3 with current of a predetermined polarity changes the magnetic flux in the axis air gaps 15, 19 at the magnet armature 14, thus either amplifying the magnetic flux in the gap 15 and attenuating it in the gap 19, or vice versa. The magnet armature 14 and the valve body 12 react to this either by moving toward the second pole body 8 or by moving toward the first pole body 7.

The magnetic induction of the permanent magnets 21 that is required can be calculated as follows:

If $B_P$ represents the permanent magnetic field and $B_E$ the intensity of the electromagnetic field, then the following equation applies to the force on the magnet armature 14, with the constant C:

$$F=C\,((B_P+B_E)^2-(B_P-B_E)^2) \qquad (1)$$

where the first element in parentheses represents the force in the gap 15, for instance, and the second element in parentheses represents the force in the gap 19. By applying the binomial theorem, $$F=4C\,B_PB_E. \qquad (2)$$

The applicable equation for the force generated by the soft-iron magnet is:

$$F_E=C(B_E)^2 \qquad (3)$$

Comparing equations (2) and (3) the result is that for $$B_P \geqq \tfrac{1}{4}B_E \qquad (4)$$

the force F upon the magnet armature 15 becomes greater than the force $F_E$ of the soft-iron magnet; thus by superimposing the permanent magnet field, the result is a reinforcement of the force acting upon the magnet armature 14.

The net force ΔF, which is often more important, is already greater from $$B_P \geqq \tfrac{1}{8}B_E \qquad (5)$$

on, according to equation (2), because of the reversible polarity of $B_E$ and thus of F.

The operating principle of the magnetic valve according to the invention may be explained as follows, taking into account the operative magnetic forces in the lower part of the magnetic valve of FIG. 1, between the first pole body 7 and the magnet armature 14. For the sake of clarity, those first pole piece 6 of the first pole body 7 that become south poles under the influence of the permanent magnets 21 are identified as 25, while those that become north poles under the influence of the permanent magents 21 are identified as 26.

If current flows through the magnetic coils 3 in such a way that the electromagnetic flux also causes the pole pieces 26 to become north poles and the pole pieces 25 to become south poles, then by superimposition with the pole characteristic defined by the permanent magnets 21, the result is a reinforcement of the magnetic flux in the gap 19. The result is a force upon the magnet armature 14 in the direction toward the first pole body 7 and thus the closure of the valve seat 18 by the closing head 38.

On the other hand, if current flows through the magnetic coils 3 in such a way that electromagnetic flux causes the pole pieces 25 to become north poles and the pole pieces 26 to become south poles, then by superimposition with the pole characteristic defined by the permanent magnets 21 the result is an attenuation of the magnetic flux in the gap 19.

The above discussion of the operating principle related solely to the magnetic force operative in the gap 19. Since the position and polarity of the permanent magnets 21 inside the upper, second pole body 8 remote from the valve seat 18 are identical to those inside the first pole body 7, influence upon the forces acting on the magnet armature is exerted in such a way that whenever the forces of the permanent magnetic field and the electrical magnetic field are superimposed and thus reinforce one another in the gap 19 nearer the valve, there is a simultaneous subtraction of the operative force of the two magnetic fields in the gap 15 remote from the valve, and vice versa. Thus a double force action can be said to be involved, and the magnetic valve can be said to be double-acting.

A particularly advantageously designed embodiment of the magnetic valve acording to the invention, having four magnetic coils 3, is shown in FIG. 3, in which individual elements functioning the same as those of FIGS. 1 and 2 are identified by the same reference numerals. A particularly advantageous feature is the simple structure of the first pole body 7 (this applies equally to the second pole body 8 in this case). Two flat permanent magnets 29 are inserted, with their flat sides parallel to one another, into this first pole body 7, which is again preferably cylindrical, such that the permanent magnets 29 are disposed spaced apart by the same distance from the central longitudinal axis of the magnetic valve. The distance by which the two permanent magnets 29 are spaced apart from one another is suitably equal to or greater than the diameter of the bore 9 that receives the valve body 12. If the spacing between the two permanent magnets 29 is greater than the diameter of the bore 9, then the cylindrical first pole body 7 is symmetrically divided by the two permanent magnets 29 into two first outer pole pieces 30, 34, having the cross-sectional shape of a segment of a circle, and a first central pole piece 31. In the borderline case, where the distance between the two permanent magnets 29 is equal to the diameter of the bore 9, the first central pole piece 31 is divided into two independent halves, each symmetrical to the central longitudinal axis.

The flat permanent magnets 29 are magnetically induced and installed in such a manner that that the flat sides forming facing poles each have the same polarity. The outward-facing flat sides of the permanent magnets 29 likewise have the same polarity. The connection between the cores 4 and the first outer pole pieces 30, 34 cooperating with them, or the first center pole piece 31, is brought about in the same manner as in the first exemplary embodiment shown in FIG. 1, that is, in a U-shaped first conductor body 16. The permanent magnets 29 are inserted into the first pole body 7 in such a way that their flat sides extend parallel to the particular two first conductor bodies 16 that contain the first central pole piece 31.

The advantage of the embodiment shown in FIG. 3 of a magnetic valve according to the invention is that only two permanent magnets 29 are used, with the same mode of operation as that attained in an embodiment having four permanent magnets 21 as shown in FIG. 2.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A magnetic valve having a magnetic armature, at least two magnetic coils with one conductor body of ferromagnetic material being associated with each magnetic coil, and having at least one permanent magnet engaging each conductor body, characterized in that said at least two magnetic coils are disposed symmetrically with respect to a central axis of the magnetic valve in a plane located at right angles thereto, each of said two magnetic coils being arranged to surround a respective core, said core forming a component of a respective first conductor body provided in a U-shaped embodiment, said first conductor body including a crossbar engaging the core and leading radially to a center axis of the magnetic valve, a plurality of pole pieces being provided each arranged to engage the crossbar and each disposed between a respective one of said at least two magnetic coils and a central valve body, said plurality of pole pieces having a permanent magnet inserted between adjacent pairs of said pole pieces so as to form a first pole body, said pole pieces being disposed symmetrically about the central axis, said permanent magnet being disposed so that its magnetic poles rest against associated faces of adjacent pole pieces, and further being provided with contacting faces oriented toward a respective pole piece having a same polarity, said valve body being slidingly supported coaxially in said first pole body and joined to said magnetic armature so as to define a first air gap opposite the first pole body and a second air gap on an opposite side of the magnetic armature between the magnetic armature and a second pole body disposed in opposition symmetrically to said first pole body, and said second pole body, like said first pole body, comprises second pole pieces disposed about said valve body arranged to engage a crossbar with a permanent magnet disposed between adjacent pairs of said pole pieces to form second conductor bodies.

2. A magnetic valve as defined by claim 1, characterized in that said at least two magnetic coils comprise four magnetic coils and the first pole body and second pole body each have two cooperating first and second outer pole pieces, each joined to one core and cooperating with one another, which have flat sides extending parallel to one another and surround a further cooperating first and second central pole piece joined to two cores located opposite one another, and that one permanent magnet each is inserted between the facing flat sides of the respective first and second outer pole pieces and first and second central pole piece, with the poles of the permanent magnet resting on the associated flat sides of the adjacent pole pieces and the polarity of the one permanent magnet being symmetrical to the polarity of the respective other permanent magnet.

3. A magnetic valve as defined by claim 1, characterized in that the valve body, when in contact with a stop integral with the housing, defines a first terminal point of the movement of the magnet armature, and that the valve body in cooperation with a valve seat defines a second terminal point of the movement of the magnet armature.

4. A magnetic valve as defined by claim 2, characterized in that the valve body, when in contact with a stop integral with the housing, defines a first terminal point of the movement of the magnet armature, and that the valve body in cooperation with a valve seat defines a second terminal point of the movement of the magnet armature.

* * * * *